Nov. 21, 1967  H. A. LEHMANN  3,353,423
CONTROL MECHANISM FOR POWER OPERATED MACHINERY
Filed Jan. 27, 1966  2 Sheets-Sheet 2
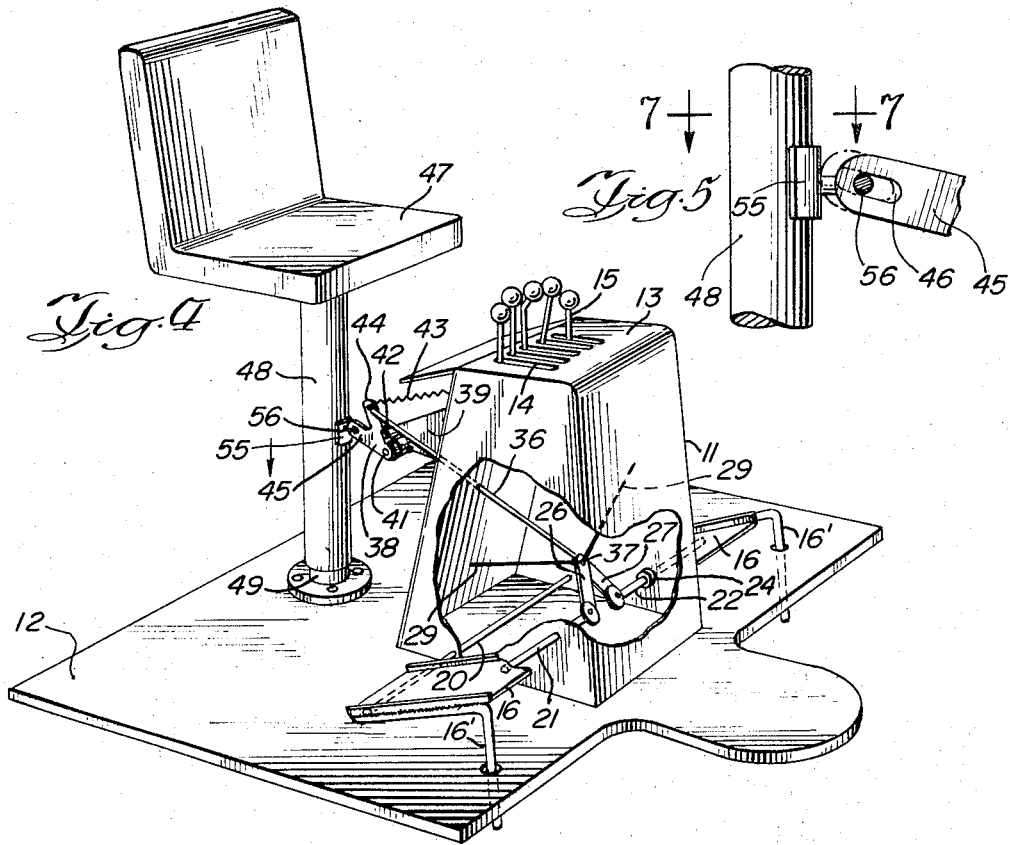
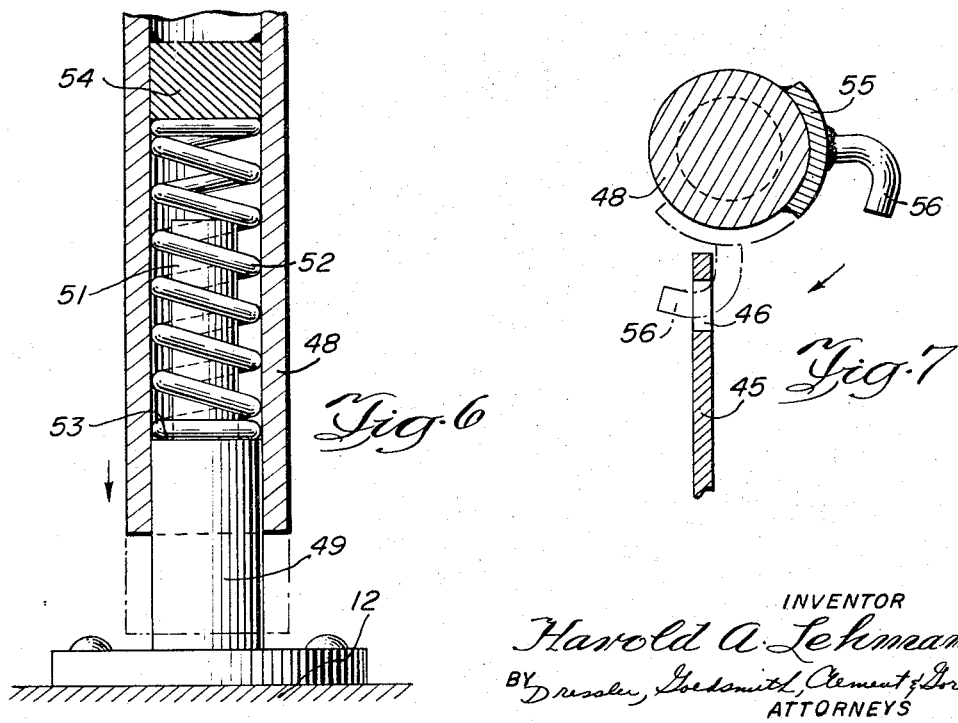
INVENTOR
Harold A. Lehmann
BY Dressler, Goldsmith, Clement & Gordon
ATTORNEYS

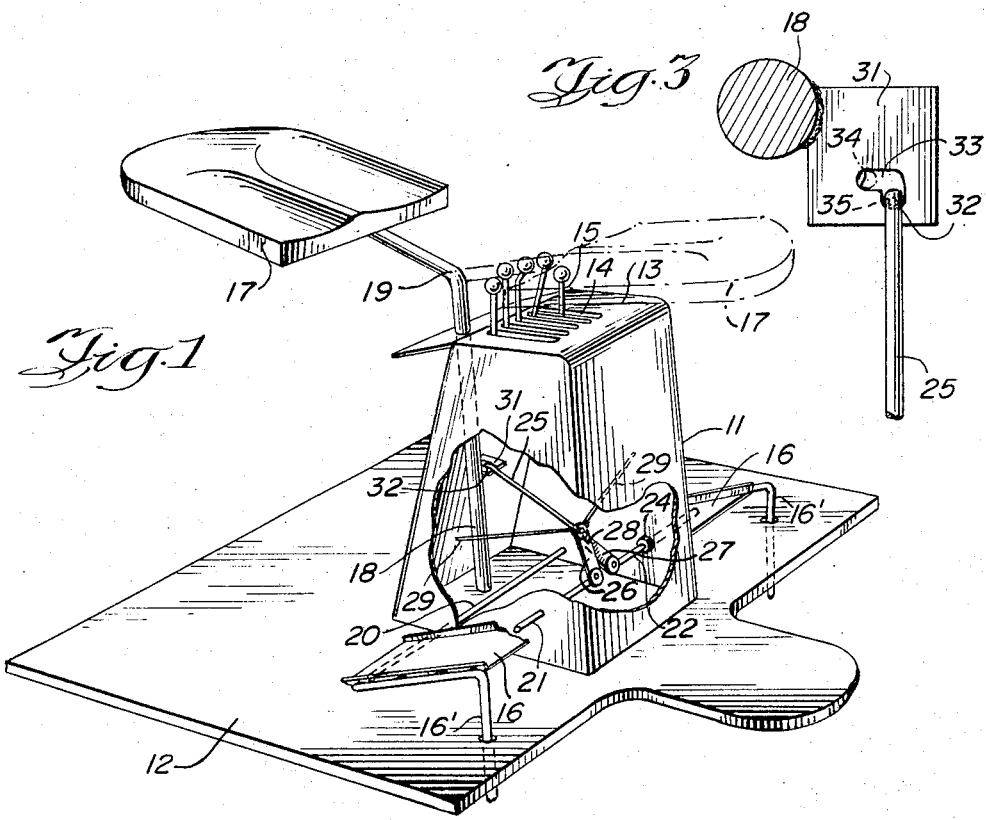
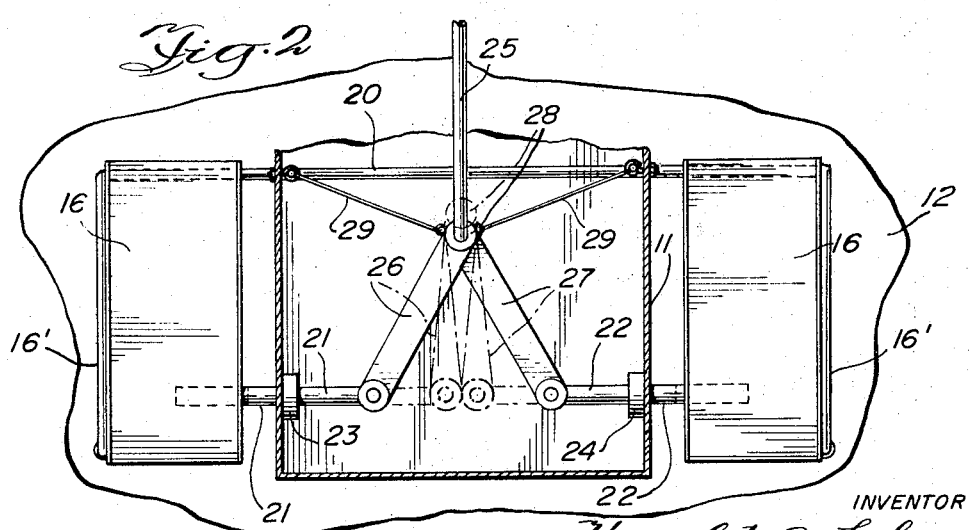

United States Patent Office 3,353,423
Patented Nov. 21, 1967

3,353,423
CONTROL MECHANISM FOR POWER
OPERATED MACHINERY
Harold A. Lehmann, Racine, Wis., assignor to J. I. Case
Company, a corporation of Wisconsin
Filed Jan. 27, 1966, Ser. No. 523,400
12 Claims. (Cl. 74—526)

This invention relates to a safety mechanism for power operated machinery, and is particularly concerned with means for eliminating accidental actuation of such machinery.

The invention will be described with particular reference to the controls for a backhoe mounted on the rear end of a tractor, for which it is particularly designed, but it will be understood that the advantages of the invention are not limited to such environment. The invention may be used with many other types of power operated machinery.

A backhoe mounted on the rear end of a tractor cannot be operated properly by an operator sitting in the driver's seat when located in its normal position, because the seat is facing the wrong direction. It is customary to provide an operator's seat that is adapted to face rearwardly to enable the operator to observe the operation of the backhoe. The operator's seat is usually mounted so that it may be moved between a first and a second position. In its first position, the seat is out of the way of the operator while he is driving the tractor. When the tractor is properly located for a particular backhoe operation, the operator dismounts from the driver's seat, moves the operator's seat to its second position, and then sits down on it to operate the backhoe.

A backhoe of the type illustrated is provided with swing mechanism that is controlled by valves or switch means that are actuated by a pair of foot operated pedals. The foot pedals are provided in order to leave the operator's hands free for other operations that should be done while the boom is being swung from one position to another. The simultaneous performance of two or more operations by a single operator increases the efficiency of the entire operation by reducing the total time required.

Accidental swinging movement of a boom may cause considerable damage, and the possibility of such accidental movement is minimized by the safety control mechanism of the present invention.

In accordance with the present invention, the control mechanism absolutely prevents movement of the foot pedals, and therefore of the swing mechanism, when the operator's seat is in its first or inoperative position. For example, an operator climbing up on the tractor to operate the backhoe cannot swing the boom around by accidentally stepping on one of the pedals. In one embodiment of the present invention, the operator's seat must be facing rearwardly before the swing mechanism can be operated, and, in a second embodiment, the operator must be actually seated and facing rearwardly before the swing mechanism can be operated.

Suitable structure by means of which the above mentioned and other advantages of the invention are attained will be described in the following specification, taken in conjunction with the accompanying drawings showing preferred embodiments of the invention, in which:

FIGURE 1 is a perspective view showing one embodiment of the control mechanism of the present invention, with portions broken away to facilitate illustration, and with the foot pedals held against movement;

FIG. 2 is a fragmentary diagrammatic view, with solid lines showing the linkage in position to prevent movement of the pedals, and dotted lines showing the linkage in retracted position;

FIG. 3 is an enlarged fragmentary top plan view showing the means connecting the linkage to a rotatable post on which the operator's seat is mounted;

FIG. 4 is a perspective view showing another embodiment of the control mechanism;

FIG. 5 is an enlarged fragmentary elevational view of the embodiment of FIG. 4, showing the means for connecting one end of the linkage to the rotatable post on which the operator's seat is mounted;

FIG. 6 is an enlarged fragmentary sectional view of the post structure for supporting the seat in the embodiment of FIG. 4; and FIG. 7 is an enlarged cross sectional view, taken along the line 7—7 of FIG. 5.

Referring to FIGS. 1 to 3 of the drawings, a housing 11 is mounted on a platform 12 which may be part of a tractor structure (not shown) or may be secured to the chassis of a tractor in any suitable manner.

A backhoe of the type to which this invention may be applied is illustrated in U.S. Patents 3,047,171 and 3,170,-579. The housing 11 has a top wall 13 provided with a plurality of slots 14 through which the upper ends of the operating levers 15 project. The backhoe that is operated by the levers 15 is provided with a swing mechanism controlled by valves actuated by pivotal movement of a pair of foot operated pedals 16 and related members 16′ mounted adjacent opposite sides of the housing 11. A rod 20 extends through the housing 11 parallel to the platform 12 to provide pivotal support for the pedals 16. If desired, the swing mechanism may be operated by an electrical circuit energized by switch means actuated by the movement of the pedals 16. The actual control mechanism forms no part of the present invention.

Seat means provided for the operator comprises an operator's seat 17 mounted in any suitable manner on the upper end portion of a post 18 that is rotatably mounted in the housing 11 and extends through an aperture provided therefor in the top wall 13 of the housing. The upper end portion of the post 18 is bent angularly, as indicated at 19, to locate the operator's seat at a comfortable angle.

The operator moves the operator's seat into a first position shown in dotted lines, in which it is out of his way, before driving the tractor to position it for operation of the backhoe. When the tractor is properly positioned, the operator dismounts from the driver's seat and moves the operator's seat into the position shown in solid lines before he starts operating the backhoe. The control mechanism of the present invention includes safety means that prevents operation of the swing mechanism until the operator's seat has been moved into its second position, thus minimizing the possibility of accidental swinging of the backhoe from one side to the other until the operator is in position to observe and control the swinging movement.

The safety means in question comprises a pair of bars 21 and 22 mounted in axial alignment in bushings 23 and 24, respectively, at opposite sides of the housing 11. The bars 21 and 22 are connected to the seat means by linkage means comprising a rod 25 and a pair of links 26 and 27. Each of the links is pivotally secured at one end to one end of the rod 25, as indicated at 28, and at the other end to the inner end of either bar 21 or 22. A pair of cables 29, each secured to supporting means on the opposite side walls of the housing 11, provide a swinging support for the linkage adjacent the pivotal connection 28.

The rear end of the rod 25 is supported by a horizontally disposed plate 31 that is rigidly secured to the post 18. The rod 25 may be interconnected to the plate 31 in any suitable manner, such as, for example, by bending the rear end portion of the rod 25 and inserting the bent end 32 in an L-shaped slot 33 in the plate 31. The bent end 32 of the rod engages one end 34 of the slot 33 when the seat 17 is in the inoperative position. When the seat is in an operative position, as shown in FIG. 1, the bent end 32 of the rod 25 engages the opposite end 35 of the slot 33.

The seat 17 is moved from its first (inoperative) position to its second (operative) position by counterclockwise rotational movement of the seat and the post about the axis of the post. The rotational movement of the seat and the post is limited to 180° by any suitable stop means, and is reversed to move the seat back to its first position. During the initial portion of the rotational movement of the seat from its first position to its second position, the plate 31 moves relative to the rod 25 until the end 35 of the slot engages the bent end 32 of the rod 25. Continued rotational movement of the seat in a counterclockwise direction after this engagement causes the plate 31 to retract the rod 25, thereby moving the bars 21 and 22 axially toward each other to free them from their engagement with the underside of the pedals 16 thus permitting the pedals to be moved and the backhoe rotated.

When the seat 17 is moved from its operative to its inoperative position, the plate 31 moves relative to the rod 25 until the end 34 of the slot engages the bent end 32 of the rod, and then moves the rod 25 forwardly to spread the bars 21 and 22 and positions them below their respective pedals. It is preferred to position the bars 21 and 22 under the pedals to prevent movement of the pedals and consequent operation of the swing mechanism, but it will be understood that the bars 21 and 22 may be engaged with the pedals in any suitable manner to prevent movement of the pedals. When the pedals 16 are held against movement, the operator may climb up on the rear of the tractor without any danger of accidentally actuating the swing mechanism and thereby moving the boom to which the backhoe is connected. After the operator is standing on the platform 12 he may move the seat 17 into its operative position and then seat himself to face rearwardly while he operates the backhoe.

Much of the structure of the embodiment of FIGS. 4 to 7 is the same as that of FIGS. 1 to 3, and the description thereof will not be repeated. Identical structure will be designated by the same reference numerals.

In the embodiment of FIGS. 4 to 7, the links 26 and 27 are each pivotally connected at one end to a rod 36, as indicated at 37. The other end of the rod 36 is connected to a bell crank 38 pivotally supported by a bracket 39, as indicated at 41. The bracket 39 is mounted on the housing 11 and is provided with stop means 42 to limit the pivotal movement of the bell crank. The bell crank is pivoted on a horizontal axis, and a spring 43 secured to the housing 11 and to one arm 44 of the bell crank urges it toward its uppermost position. The other arm 45 of the bell crank has an aperture 46 for a reason hereinafter disclosed.

An operator's seat 47 is mounted on a tubular post 48 that is telescoped over a post 49 extending upwardly from the platform 12. The post 49 has an upper section 51 of reduced cross section to provide clearance between it and the inner surface of the tubular post 48 for a compression spring 52. The spring 52 encircles the post section 51 and has its lower end biased against a shoulder 53 on the post 49 adjacent the bottom of the section 51. The upper end of the spring 52 is biased against a plug 54 fixed within the post 48.

The tubular post 48 is rotatable relative to the post 49, but it is preferred to provide stop means to limit such rotation to 180°. The post 49 may be located to permit the operator to sit on the seat 47 to drive the tractor when the seat is facing forwardly, and to operate the backhoe when it is facing rearwardly. When there is no load on the seat, the spring 52 holds the seat in its uppermost position with the bottom of the post 48 spaced from the platform 12.

A plate 55 that is rigidly secured to the post 48 has a curved prong 56 extending outwardly therefrom. In the uppermost position of the seat 47 the prong 56 is aligned with the aperture 46 which is in the same horizontal plane. Rotational movement of the seat 47 to make it face rearwardly causes the prong 56 to move into the aperture 46, but does not affect the linkage that holds the bars 21 and 22 in engagement with the pedals 16 to prevent movement thereof.

If the seat 47 is facing rearwardly, with the prong 56 engaged with the aperture 46, when the operator gets on the seat, his weight will force the seat downwardly to its second position and move the bell crank 38 counterclockwise about its pivot 41 to retract the rod 36 and disengage the bars 21 and 22 from the pedals 16. The operator is then free to move the pedals to actuate the swing mechanism.

Although I have described a few embodiments of the invention in considerable detail, it will be understood that the description thereof is intended to be illustrative, rather than restrictive, as many details of structure may be modified or changed without departing from the spirit or scope of the invention. Accordingly, I do not desire to be restricted to the exact structure described.

What is claimed is:

1. A control mechanism for power operated machinery, said mechanism comprising pedal means movable to actuate said machinery, seat means movable between a first and a second position, safety means movable into engagement with said pedal means to prevent operation thereof and movable out of said engagement to permit operation of said pedal means, and linkage means interconnecting said seat means and said safety means and responsive to movement of said seat means to move said safety means into engagement with said pedal means when said seat means is moved into said first position, and out of engagement with said pedal means when said seat means is moved into said second position.

2. The structure recited in claim 1 in which said seat means comprises a post, a plate rigidly secured to said post, and a seat mounted on said post, said post being mounted to rotate through approximately 180° between said first and second poistions, and said plate engaging said linkage means to move said safety means into and out of engagement with said pedal means as said post is rotated.

3. The structure recited in claim 1 in which said seat means comprises a post, a seat mounted on said post, and a compression spring, the lower end of said post being supported on said compression spring, said spring moving said seat into said first position when said seat is empty, and permitting it to move into said second position when an operator is seated thereon.

4. The structure recited in claim 1 in which said safety means comprises a pair of axially aligned bars and means for supporting said bars for axial movement in opposite direction.

5. The structure recited in claim 1 in which said linkage means includes a pair of links each pivotally connected at one end to said safety means, a rod, and means pivotally connecting one end of said rod to both of said links.

6. The structure recited in claim 4 in which said linkage means comprises two separate links each connected at one end to one of said bars, a rod, and means pivotally connecting one end of said rod to the opposite ends of both of said links.

7. The structure recited in claim 4 in which said linkage means comprises a bell crank mounted for pivotal movement in a vertical plane, means securing said bell crank to said seat means, a pair of links pivotally connected to said bars, and a rod interconnecting said bell crank and said links.

8. The structure recited in claim 7 in which a spring having one end fixed is connected at its other end to said bell crank to urge said axially aligned bars into engagement with said pedal means.

9. The structure recited in claim 7 in which said seat means comprises a post, a seat mounted on said post, and a compression spring, the lower end of said post being supported on said spring whereby said spring normally holds said seat means in said first position and yields to the weight of the operator to permit said seat means to move into said second position when the operator is seated on said seat.

10. The structure recited in claim 5 in which said seat means includes a post mounted to rotate as said seat means is moved between said first and second positions, and a plate rigidly secured to said post, the other end of said rod being connected to said plate whereby said rod is moved in response to rotation of said post.

11. The structure recited in claim 5 in which said seat means includes a post mounted to rotate as said seat means is moved between said first and second positions, and a plate rigidly secured to said post, said plate having an L-shaped slot closed at each end, the other end of said rod extending into said slot and forming a lost motion connection with said plate, whereby said rod is moved in response to rotation to said post during predetermined portions of the rotational movement of said post.

12. The structure recited in claim 9 in which said means for securing said bell crank to said seat means is operative only when said seat means is in its rearmost position.

No references cited.

MILTON KAUFMAN, *Primary Examiner.*

F. D. SHOEMAKER, *Assistant Examiner.*